United States Patent
Escott et al.

(10) Patent No.: US 12,500,744 B2
(45) Date of Patent: Dec. 16, 2025

(54) SECURING APPLICATION COMMUNICATION

(71) Applicant: QUALCOMM Incorporated, San Diego, CA (US)

(72) Inventors: Adrian Edward Escott, Reading (GB); Soo Bum Lee, San Diego, CA (US); Anand Palanigounder, San Diego, CA (US); Hongil Kim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 372 days.

(21) Appl. No.: 17/931,505

(22) Filed: Sep. 12, 2022

(65) Prior Publication Data
US 2023/0093720 A1   Mar. 23, 2023

Related U.S. Application Data

(60) Provisional application No. 63/245,692, filed on Sep. 17, 2021.

(51) Int. Cl.
*H04L 9/08*         (2006.01)

(52) U.S. Cl.
CPC .......... *H04L 9/0833* (2013.01); *H04L 9/0866* (2013.01)

(58) Field of Classification Search
CPC ............................ H04L 9/0833; H04L 9/0866
See application file for complete search history.

(56) References Cited

U.S. PATENT DOCUMENTS

| | | | | |
|---|---|---|---|---|
| 7,835,528 B2* | 11/2010 | Bajko | .................. | H04L 9/0891 380/278 |
| 2006/0236106 A1* | 10/2006 | Patel | .................... | H04L 9/0869 713/169 |
| 2007/0074275 A1* | 3/2007 | Bajko | .................. | H04L 9/3271 726/4 |
| 2007/0101122 A1* | 5/2007 | Guo | ...................... | H04L 9/0844 713/153 |

(Continued)

FOREIGN PATENT DOCUMENTS

| CN | 112399369 A | 2/2021 |
|---|---|---|
| WO | 2007034322 A1 | 3/2007 |

OTHER PUBLICATIONS

International Search Report and Written Opinion—PCT/US2022/043320—ISA/EPO—Dec. 8, 2022.

*Primary Examiner* — Jason Chiang
(74) *Attorney, Agent, or Firm* — Polsinelli LLP

(57) ABSTRACT

In embodiments of systems and methods for synchronous content presentation, a user equipment (UE) may generate a freshness parameter, generate a unique session key based on a first session key and the freshness parameter, and send the freshness parameter to a Network Application Function (NAF) of a network device in a configuration that will enable the NAF to generate the unique session key. The network device may receive the freshness parameter, receive from a Key Server Function (KSF) the first session key, and generate based on the freshness parameter and the first session key the unique session key. The UE and the network device may then conduct secure communications using the unique session key without exchanging the unique session key between the two devices.

34 Claims, 12 Drawing Sheets

(56) References Cited

U.S. PATENT DOCUMENTS

| | | | | |
|---|---|---|---|---|
| 2008/0273704 | A1* | 11/2008 | Norrman | H04L 63/08 |
| | | | | 380/278 |
| 2009/0234954 | A1* | 9/2009 | Sheehan | G06F 21/629 |
| | | | | 709/228 |
| 2011/0045799 | A1* | 2/2011 | Cofta | H04W 12/0431 |
| | | | | 455/411 |
| 2011/0055566 | A1* | 3/2011 | Norrman | H04W 12/0431 |
| | | | | 713/168 |
| 2012/0102315 | A1* | 4/2012 | Holtmanns | H04L 63/06 |
| | | | | 713/150 |
| 2015/0163669 | A1* | 6/2015 | Holtmanns | H04L 63/061 |
| | | | | 726/6 |
| 2015/0326572 | A1* | 11/2015 | Oyman | H04L 9/3247 |
| | | | | 726/4 |
| 2017/0078874 | A1* | 3/2017 | Lee | H04W 12/043 |
| 2017/0195877 | A1* | 7/2017 | Lehtovirta | H04W 8/005 |
| 2018/0270653 | A1* | 9/2018 | Wifvesson | H04W 48/16 |
| 2019/0098498 | A1* | 3/2019 | Badulescu | H04M 7/006 |
| 2020/0389788 | A1* | 12/2020 | Smeets | H04W 12/06 |
| 2020/0396088 | A1* | 12/2020 | Master | H04W 12/043 |
| 2021/0306855 | A1* | 9/2021 | You | H04W 12/72 |
| 2022/0166620 | A1* | 5/2022 | Oladimeji | H04L 63/04 |
| 2022/0200795 | A1* | 6/2022 | Pauliac | H04L 9/0841 |
| 2022/0272532 | A1* | 8/2022 | Kim | H04W 60/00 |

* cited by examiner

SECURING APPLICATION COMMUNICATION

RELATED APPLICATIONS

This application claims the benefit of priority to U.S. Provisional Application No. 63/245,692 entitled "Securing Application Communication" filed Sep. 17, 2021, the entire contents of which are hereby incorporated by reference for all purposes.

BACKGROUND

Fifth Generation (5G) New Radio (NR) and other communication technologies enable ultra-reliable low latency communication with user equipment (UEs) such as wireless devices. One application for such communication systems is the provision of a variety of services to UEs. In some cases, an Edge computing architecture may be used to deliver such services. An Edge computing architecture enables services to be provided from a network device or element (such as a server) that is located relatively closely to a UE, which may reduce end-to-end latency and decrease resource demand and consumption on a communication network. Some applications and services may employ or may require communication security to provide one or more functions.

SUMMARY

Various aspects include methods performed by a processor of a UE for securing communications. Some aspects may include generating a freshness parameter, generating a unique session key based on a first session key and the freshness parameter, sending the freshness parameter to a Network Application Function (NAF) in a configuration that will enable the NAF to generate the unique session key, and communicating with the NAF using the unique session key.

In some aspects, the freshness parameter may be generated by a security bootstrapping client of the UE, and an application client of the UE may communicate with the NAF using the unique session key. In some aspects, the security bootstrapping client of the UE may include one of a Generic Bootstrapping Architecture (GBA) client or an Authentication and Key Management for Applications (AKMA) client. In some aspects, the freshness parameter may be associated with a specific application of the UE. In some aspects, the unique session key may be associated with a specific application of the UE and the first session key may be associated with the UE. In such aspects, the specific application may include a specific instantiation of the application.

In some aspects, the freshness parameter may include a random value. In some aspects, the freshness parameter may include an incremented nonce value. In some aspects, sending the freshness parameter to a NAF in a configuration that will enable the NAF to generate the unique session key may include sending the freshness parameter to the NAF in a network service request message.

Further aspects include a UE having a processor configured to perform one or more operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

Various aspects include methods performed by a processor of a network device for securing communications. Some aspects may include receiving by the NAF from a UE a freshness parameter, receiving from a Key Server Function (KSF) a first session key, generating based on the freshness parameter and the first session key a unique session key, and communicating with the UE using the unique session key.

In some aspects, the freshness parameter may be associated with a specific application of the UE. In some aspects, the freshness parameter may include a random value. In some aspects, wherein the freshness parameter may include an incremented nonce value.

In some aspects, the unique session key may be associated with a specific application of the UE, and the first session key may be associated with the UE. In such aspects, the specific application may include a specific instantiation of the application. Some aspects may include sending to the UE a request to start secure communication. In some aspects, receiving by the NAF from the UE the freshness parameter may include receiving the freshness parameter in a network service request message.

Further aspects include a network device having a processor configured to perform one or more operations of any of the methods summarized above. Further aspects include processing devices for use in a network device configured with processor-executable instructions to perform operations of any of the methods summarized above. Further aspects include a non-transitory processor-readable storage medium having stored thereon processor-executable instructions configured to cause a processor of a network device to perform operations of any of the methods summarized above. Further aspects include a network device having means for performing functions of any of the methods summarized above. Further aspects include a system on chip for use in a network device and that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
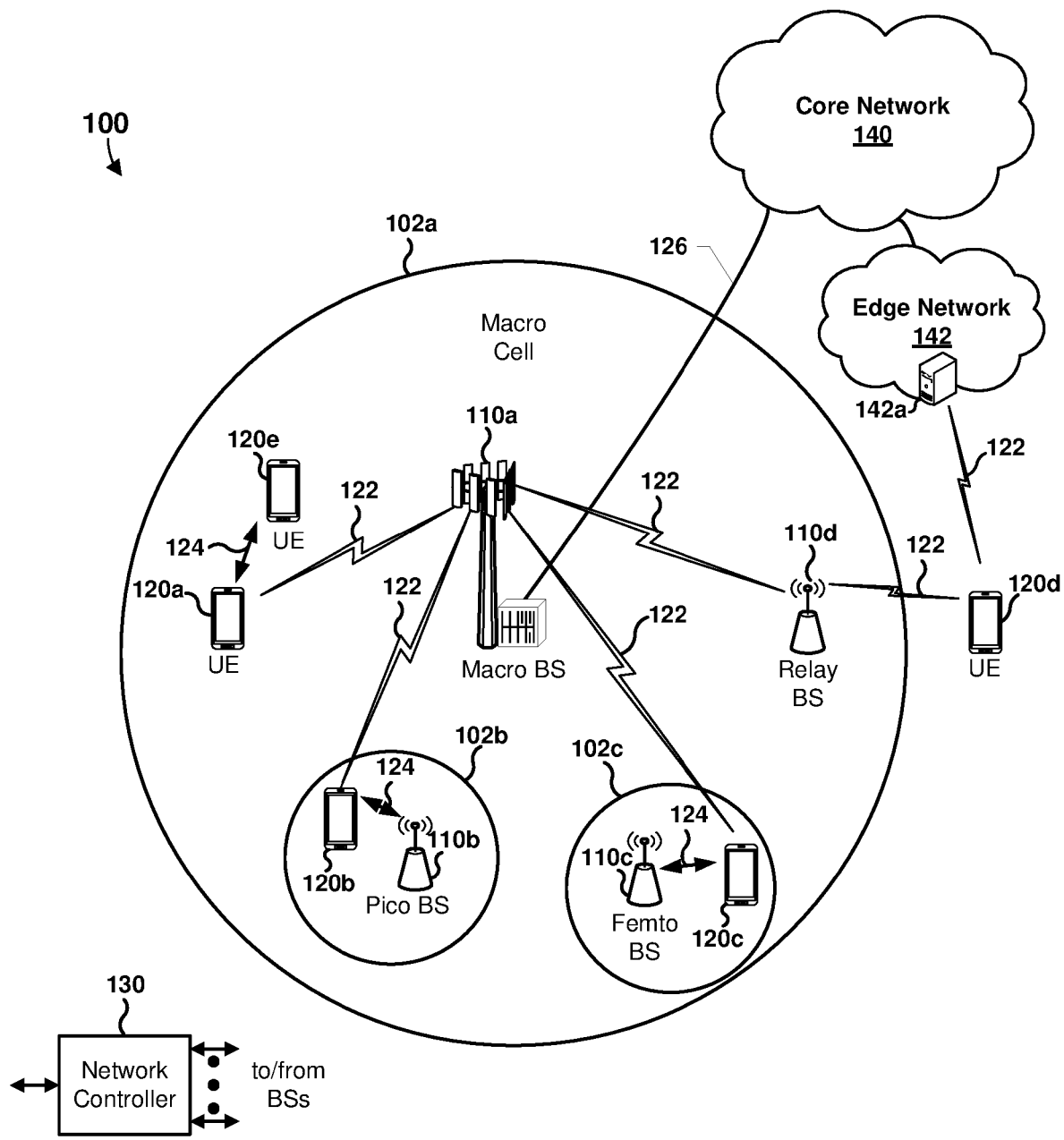
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In various embodiments, to secure communications between user equipment (UE) and a network device or element (such as a server), a key generating entity executing within a UE may be configured to generate a freshness parameter that the UE uses to generate a unique session key for use in a communication protocol, such as of a security bootstrapping operation. The UE sends the freshness parameter to the network device as part of the bootstrapping operations, and the network then uses the freshness parameter to generate the same unique session key for use in that communication protocol. The UE and the network device then use the generated unique session key to secure communications for a particular application or service. In some implementations, the UE and the network device may generate unique session keys for different applications or services. In this manner, the UE (e.g., Edge applications) and the network device (e.g., an Edge server) may secure (protect, encrypt) communications for multiple applications using a unique session key for the communications of each application. Various embodiments may be used in or as part of the Generic Bootstrapping Architecture (GBA), Authentication and Key Management for Applications (AKMA), and other suitable security architectures and protocols. For clarity, some examples may be described herein with reference to a particular security architecture or protocol, but this is not intended as a limitation on any of the described concepts.

The terms "user equipment" and "UE" are used herein to refer to any one or all of endpoint or user devices, including wireless devices, wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, UEs affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The ultra-reliable low latency communication enabled by 5G NR and other suitable communication technologies enable the provision of a variety of services to UEs. In some cases, such services may be provided at least in part using an Edge computing architecture, which enables services to be provided from a network device or element (such as a server) that is located relatively closely to a UE. Providing services from an Edge device may reduce end-to-end latency and decrease resource demand and consumption on a communication network.

Some applications and services may employ or may require communication security to provide one or more functions. For example the Generic Bootstrapping Architecture (GBA) may provide a mechanism that uses a protocol such as 3GPP Authentication and Key Agreement (AKA) to configure a shared secret between a UE and a network device. As another example, the Authentication and Key Management for Applications (AKMA) may employ similar operations between a UE and a network device (e.g., executing an Application Function (AF)). In conventional approaches, the UE and the network device share a single shared secret for all communications by all services and applications.

Various embodiments include methods and computing devices configured to perform the methods for securing communications between a UE and a network device that provides individualized communication security for an application or service. In some embodiments, the UE may generate a freshness parameter, such as by a security bootstrapping client of the UE (for example a GBA client). Using a first session key (e.g., a root key that is shared with the network device) and the freshness parameter, the UE may generate a unique session key. In various implementations, the freshness parameter may be associated with a specific application executing on, or being provided to, the UE. For example, a UE may have several different Edge applications executing on a processor of the UE that are communicating with the same Edge server. As examples, multiple simultaneous Edge applications might include a navigation application, a media (e.g., music) streaming application, and an augmented reality application, each of which should have a different unique key. In various embodiments, each of these different applications may be assigned a unique freshness parameter that is combined with the first session key by both the UE and the Edge server, thereby providing a unique session key for each application without changing the first session key used for communications between the UE and the Edge server.

In some implementations, the freshness parameter may include a random value. In some implementations, the freshness parameter may include an incremented value, such as a value of a counter that may be incremented each time a new unique session key is required (e.g., for a new application or new instantiation of an application). In some embodiments, the incremented value may be used as a nonce value (e.g., an incremented nonce value).

In various embodiments, the UE may send the freshness parameter to a Network Application Function (NAF) of the network device (for example, a NAF in GBA, an Application Function in AKMA, or another suitable function) in a configuration that will enable the NAF to generate the unique session key. In some embodiments, the UE may send the freshness parameter as part of a network service request message (e.g., an Application Request message). In various embodiments, the NAF may execute the same algorithm as used by the UE to generate the same unique session key using the freshness parameter received from the UE (i.e., a unique session key that is identical to the unique session key generated by the UE). In some embodiments, the NAF may receive (or may request and receive in response to the request) the first session key (i.e., a session key that is identical to the first session key used by the UE) from a Key Server Function (KSF) executing on a network device (such as a Bootstrapping Server Function (BSF), an AKMA function, or another suitable function). Using the freshness parameter and the first session key, the NAF may generate the unique session key. The UE and the NAF may then communicate using the unique session key without having exchanged the unique session key. In various embodiments, the UE and the NAF may generate unique session keys for each application or service of the UE (or provided to the UE by the network device).

In some embodiments, the UE may receive from the NAF a request to start secure communication. In some embodiments, the request to start secure communication may include a domain name of the NAF (e.g., a Fully Qualified Domain Name (FQDN)) and a security protocol identifier, such as for an interface between the NAF and the UE, such as a Ua interface. In some embodiments, the UE may derive (generate, calculate) the first session key based on the domain name of the NAF and the security protocol identifier. In some embodiments, the UE may generate the freshness parameter and send the freshness parameter to the network device (e.g., to the NAF) in response to the request to start secure communication received from the NAF. For example, the UE (e.g., the GBA client, AKMA client, or another suitable client) may generate the freshness parameter and pass the freshness parameter to the NAF. The UE also may use the freshness parameter and the first session key to generate the unique session key. In some embodiments, the first session key may be associated with the UE. For example, the session key, such as a Ks_NAF, Ks_int_NAF, or Ks_ext_NAF, may be a session key used in GBA. In some embodiments, the freshness parameter may be associated with a specific application (or service) of the UE. In some embodiments, the freshness parameter may be associated with a specific instantiation of an application (or service) of the UE. Further, the NAF may receive the freshness parameter from the UE and receive a version of the first session key from the KSF, and the NAF may generate its own version of the unique session key using the freshness parameter and the first session key.

In various embodiments, the UE may include the freshness parameter in an existing field of a message exchanged between the UE and the NAF. In this manner, various embodiments may be implemented without changing a protocol or architecture of messages or message exchanges. For example, for devices and networks employing the Digest AKA protocol, the freshness parameter may be included in a "cnonce" field. As another example, for devices and networks employing Transport Layer Security (TLS), the freshness parameter may be included in an existing field of a ClientHello message or another suitable message. In various embodiments, a length of the freshness parameter may be configured to fit within the existing field and/or message. In various embodiments, the UE may generate, and the UE and the network device may handle, the freshness parameter at a similar security level and/or in a similarly secured memory portion as other cryptographic or session keys.

Various embodiments enable the UE and the network device to generate a unique key for each application or service for the UE without exchanging private or secure information, such as a private key. As a result, various embodiments improve the operation of the UE, the network device, and the communication system by improving the security of communications between the UE and the network device.

FIG. 1A is a system block diagram illustrating an example communications system 100. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1). The communications system 100 may include an Edge network 142 to provide network computing resources, applications, and/or services in proximity to the mobile devices via one or more network devices 142a. The communications system 100 also may include a number of base stations (illustrated as the BS 110a, the BS 110b, the BS 110c, and the BS 110d) and other network entities. A base station is an entity that communicates with UEs, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with a service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The UEs 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a UE) and send a transmission of the data to a downstream station (for example, a UE or a base station). A relay station also may be a wireless device (e.g., a UE) that can relay transmissions for other UEs. In the example illustrated in FIG. 1, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout the communications system 100, and each UE may be stationary or mobile. A UE also may be referred to as an access terminal, a terminal, a mobile station, a subscriber unit, a station, wireless device, etc.

A macro base station 110a may communicate with the communication network 140 over a wired or wireless communication link 126. The UEs 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a subcarrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more UEs (for example, illustrated as the UE 120a and the UE 120e) may communicate directly using one or more sidelink channels (for example, without using a base station 110a-d as an intermediary to communicate with one another). For example, the UEs 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the base station 110a-110d.

Figure 1B:
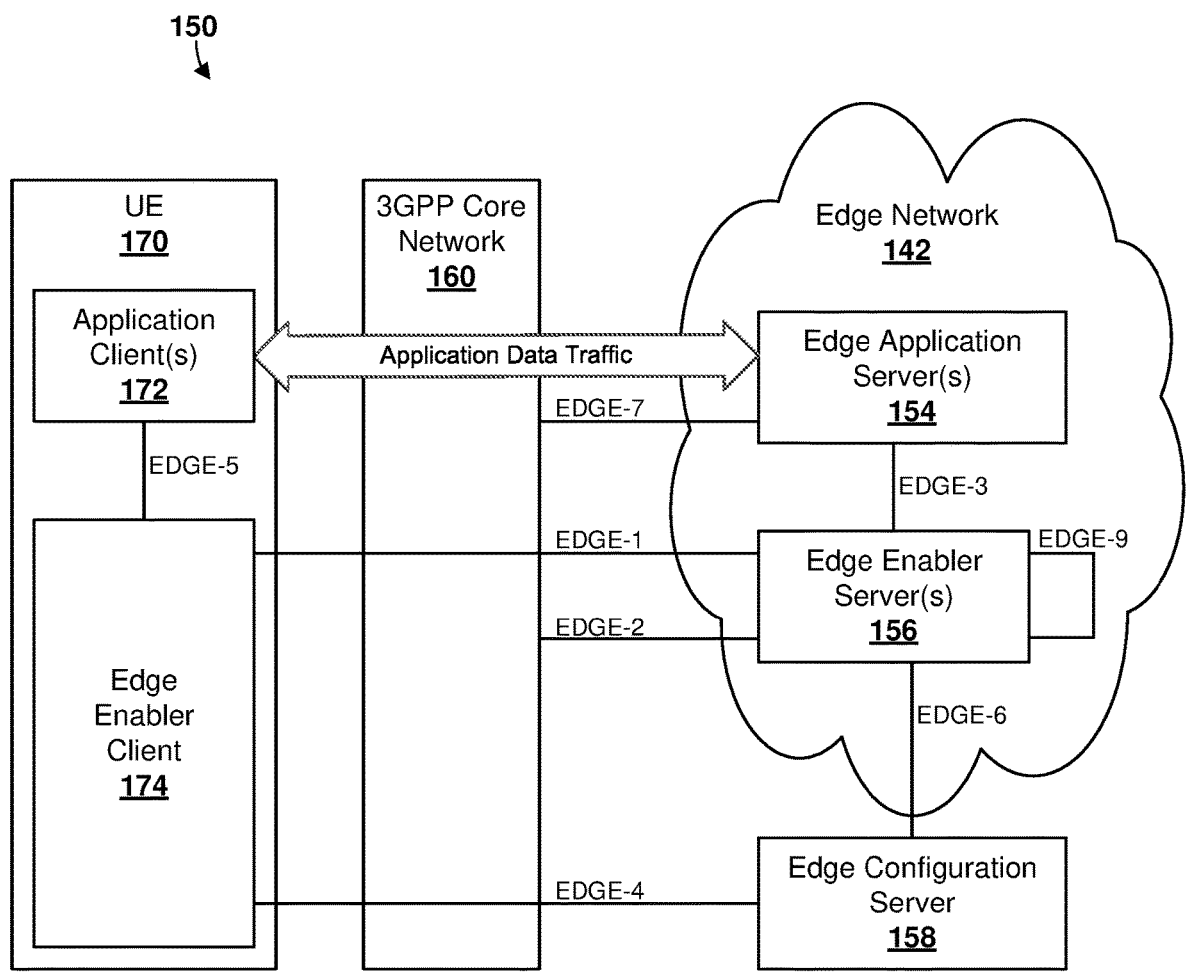
FIG. 1B is a system block diagram illustrating an example Edge computing system suitable for use with various embodiments.

FIG. 1B is a system block diagram illustrating an example Edge computing system 150 suitable for use with various embodiments. In some embodiments, Edge computing system 150 may include the Edge network 142 and a UE 170 (e.g., the UE 120a-120e) configured to communicate via a 3GPP core network 160. The Edge data network 152 may include an Edge application server 154 and one or more Edge enabler server(s) 156, in communication with an Edge configuration server 158. Examples of the Edge application server 154, Edge enabler server(s) 156, and Edge configuration server 158 include the network device 142a. The UE 170 may include an application client(s) 172 in communication with one or more Edge enabler client(s) 174. Each of the elements of the Edge computing system 150 may communicate over an Edge interface (e.g., EDGE-1, EDGE-2, . . . EDGE-9).

The Edge application server 154 and the application client(s) 172 each may be configured to process computing tasks, and may communicate application data traffic (i.e., data related to a computing task, an application, a service, etc.) via the 3GPP core network 160. The Edge enabler server(s) 156 may be configured to maintain and advertise (e.g., to devices such as the UE 170) applications provided by the Edge application server(s) 154. The Edge configuration server 158 may be configured to manage communication within and among one or more Edge data networks 152.

The Edge application server(s) 154 may provide information about its applications and their capabilities to the Edge enabler server(s) 156 via the EDGE-3 interface. The Edge enabler server(s) 156 may provide information about the Edge data network 152 to the Edge configuration server 158 via the EDGE-6 interface. The Edge application server(s) 154 and the Edge enabler server(s) 156 may communicate with the 3GPP core network 160 via the EDGE-7 interface and the EDGE-2 interface, respectively.

In some embodiments, the Edge enabler client(s) 174 may obtain information about the available Edge data networks 152 from the Edge enabler server(s) 156 via the EDGE-1 interface (and/or from the Edge configuration server 158 via the EDGE-4 interface). In some embodiments, the Edge enabler client(s) 174 may obtain information about Edge application server(s) 154 such as available applications and their capabilities via the EDGE-4 interface. In some embodiments, the Edge enabler client 174, the Edge enabler server(s) 156, and the Edge configuration server 158 may employ a discovery and provisioning procedure via their respective Edge interfaces.

The application client 172 may communicate with the Edge enabler client(s) 174 via the EDGE-5 interface. In some embodiments, the Edge enabler client(s) 174 may obtain information about available Edge data networks 152 from the Edge configuration server 158 via the EDGE-4 interface, and may coordinate the use of the Edge application server(s) 154 with the Edge enabler server(s) 156 via the EDGE-1 interface. The Edge enabler server(s) 156 may coordinate with one another via the EDGE-9 interface.

Figure 2:
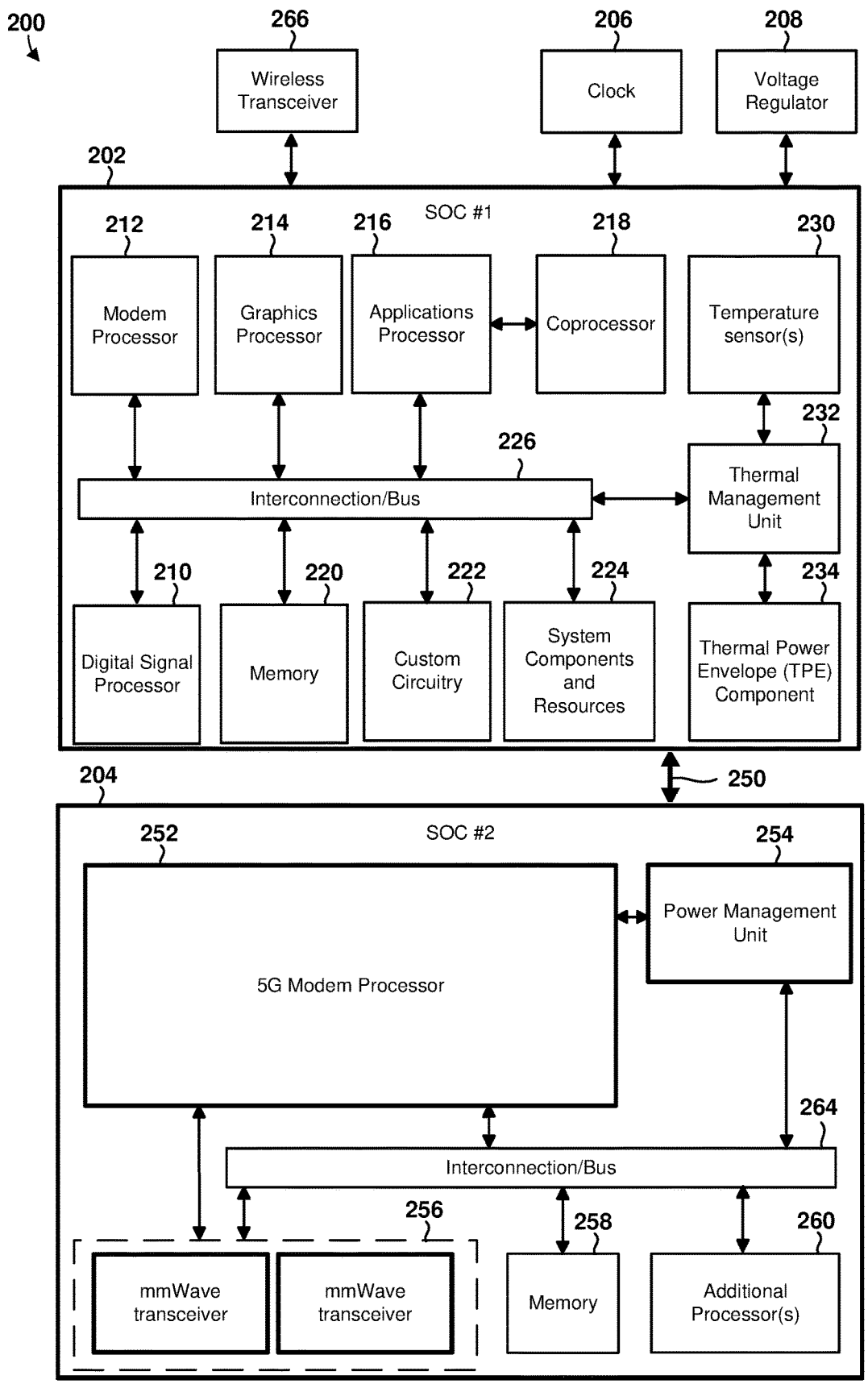
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from UEs, such as a base station 110*a*. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
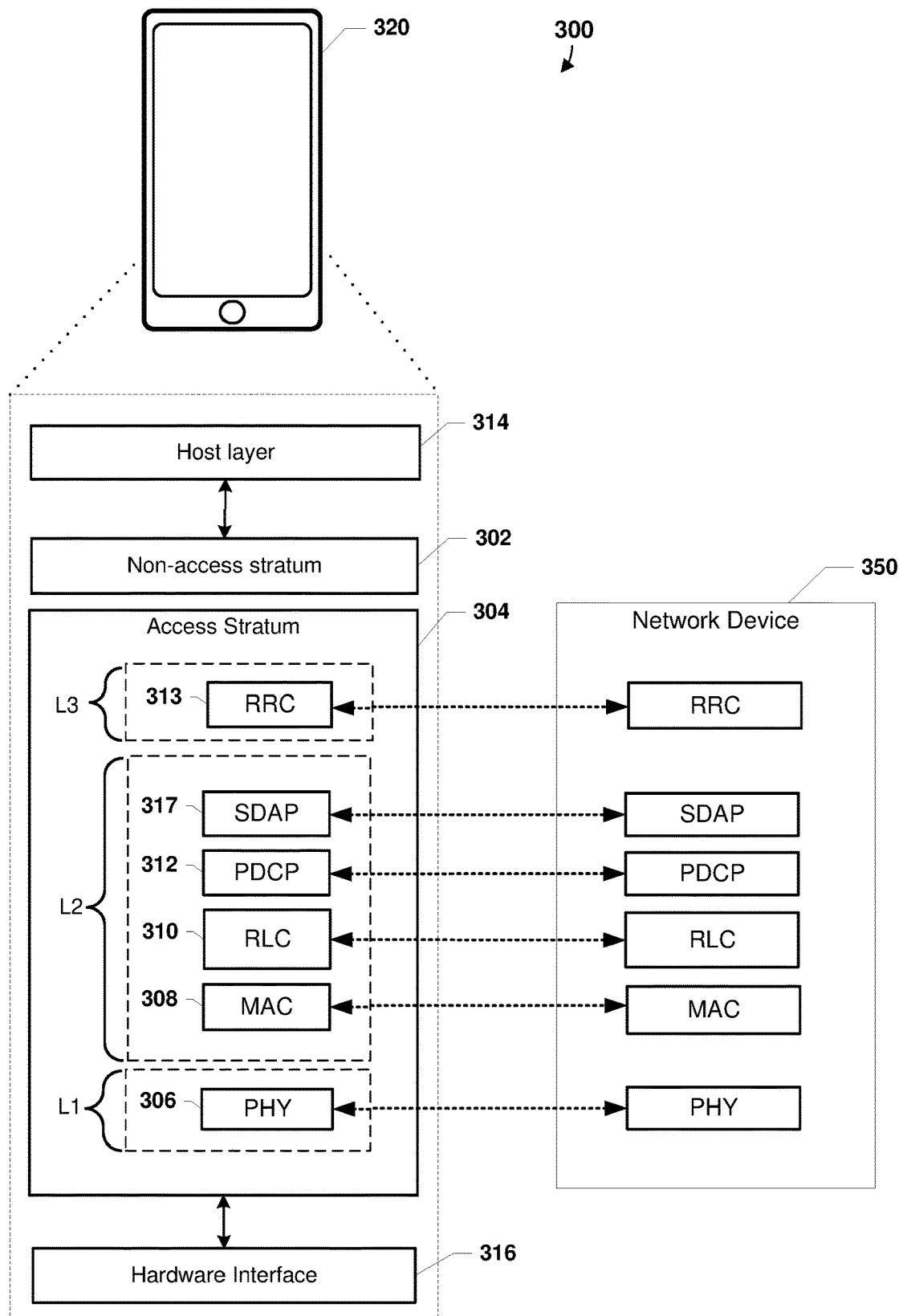
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1A-3, the UE 320 may implement the software architecture 300 to facilitate communication between a UE 320 (e.g., the UE 120a-120e, 200) and a network device 350 (e.g., network device 142a in the Edge network 142) of a communication system (e.g., 100). In various embodiments, layers in software architecture 300 may form logical connections with corresponding layers in software of the network device 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network device 350 over the physical layer 306. In some implementations, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer each of which form logical connections terminating at the network device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network device 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
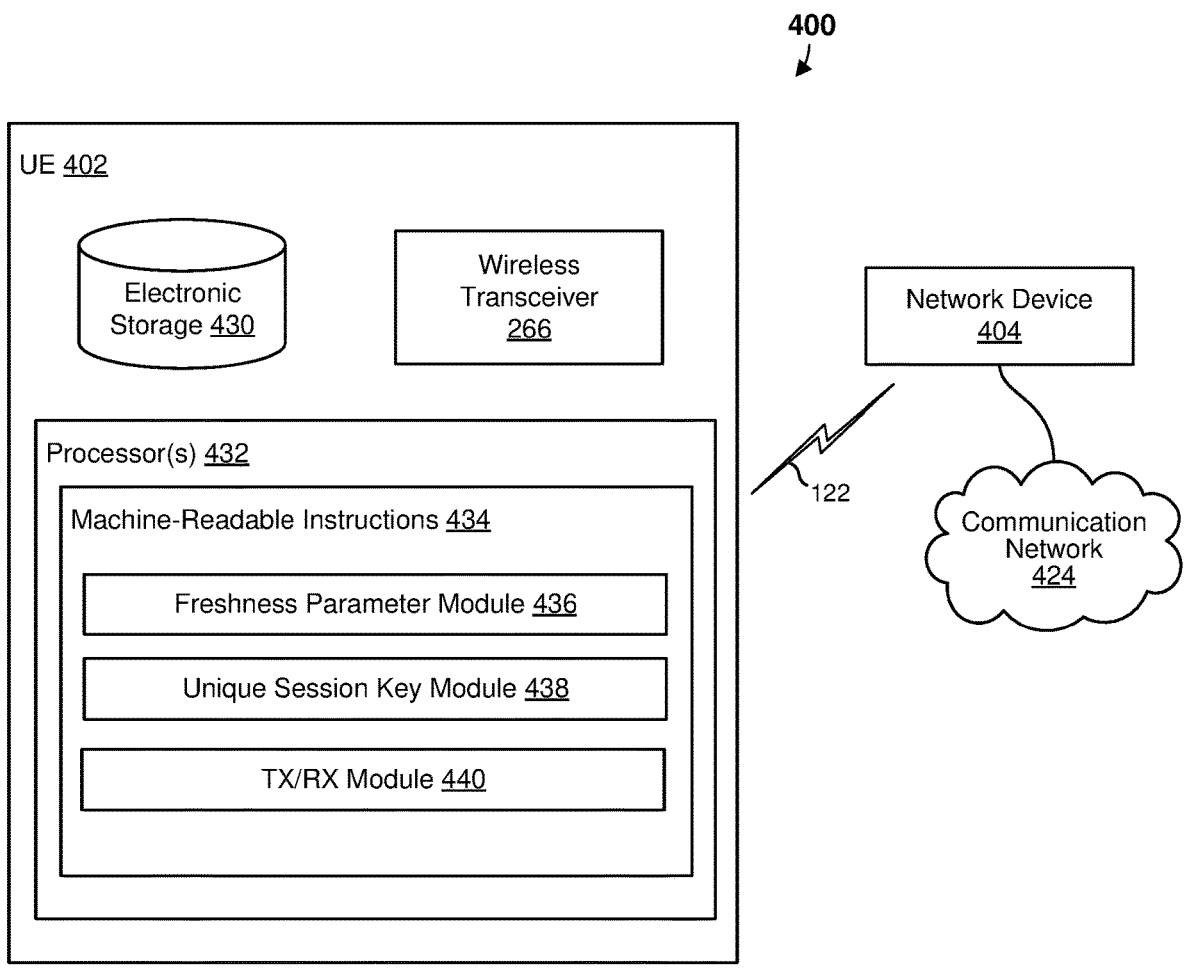
FIGS. 4A and 4B are component block diagrams illustrating a system configured for enhancing coverage for initial access accordance with various embodiments.
Figure 4B:
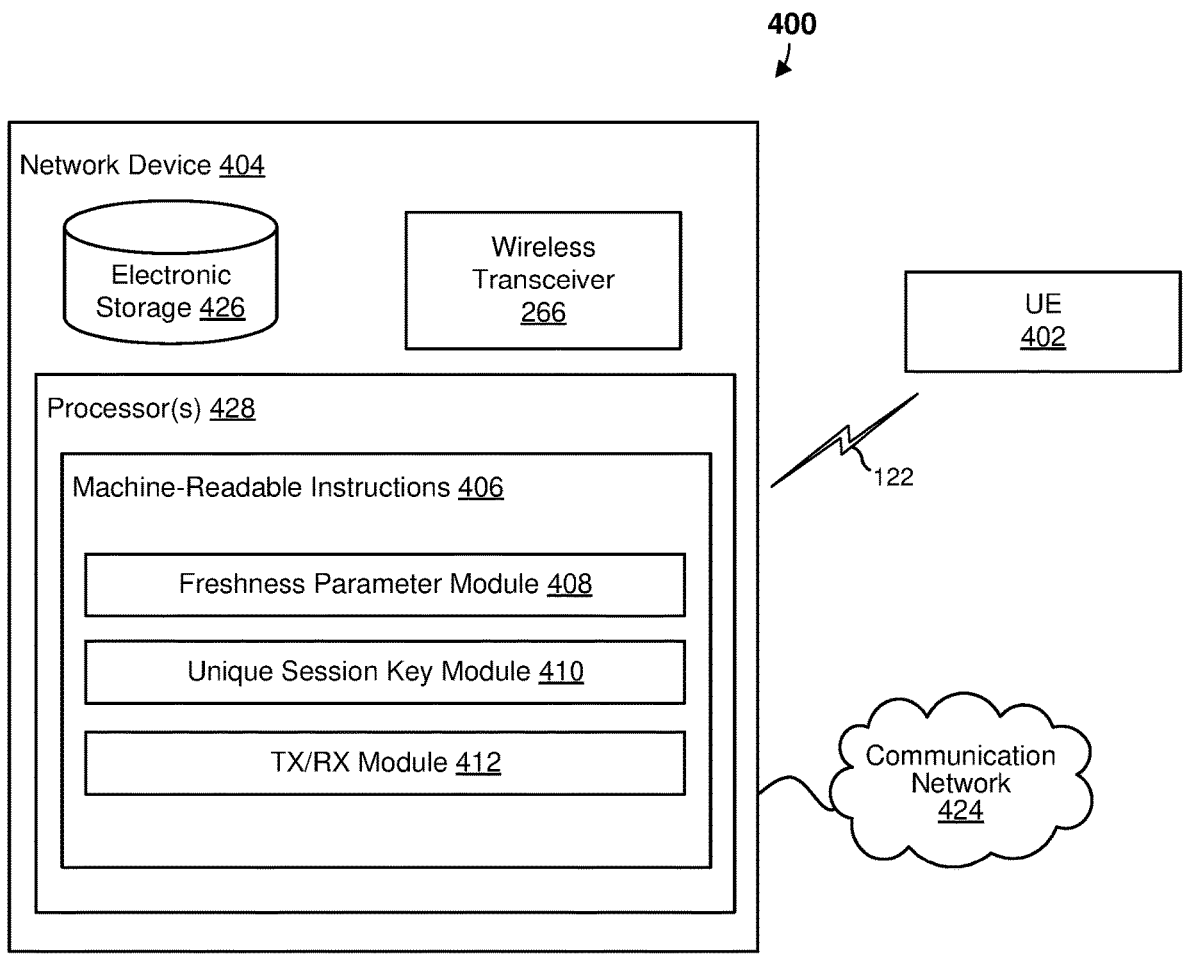

FIGS. 4A and 4B are component block diagrams illustrating a system 400 configured for enhancing coverage for initial access accordance with various embodiments. With reference to FIGS. 1A-4B, the system 400 may include a UE 402 (e.g., 120a-120e, 170, 320) and a network device 404 (e.g., 142a, 154, 156, 158, 350). In some embodiments, the UE 402 and the network device 404 may exchange wireless communications in order to establish a wireless communication link (e.g., 122).

The UE 402 and the network device 404 may include one or more processors 428, 432 coupled to electronic storage 426, 430 and a wireless transceiver (e.g., 266). In the UE 402 and the network device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the UE 402, the processor(s) 432 may be configured by machine-readable instructions 434. Machine-readable instructions 406 may include one or more instruction modules. The instruction modules may include computer program modules. The instruction modules may include one or more of a freshness parameter module 436, a unique session key module 438, a TX/RX module 440, and/or other instruction modules.

The freshness parameter module 436 may be configured to generate a freshness parameter. In some embodiments, the freshness parameter module 436 may execute within a security bootstrapping client of the UE 402, such as a GBA client. In some embodiments, the freshness parameter module 436 use a random number generator to generate a random number for use as the freshness parameter. In some embodiments, the freshness parameter module 436 use a counter to generate nonce value for use as the freshness parameter.

The unique session key module 438 may be configured to generate a unique session key based on a first session key and the freshness parameter. In some embodiments, the freshness parameter may be associated with a specific application of the UE 402. In some embodiments, the first session key may be associated with the UE 402. In some embodiments, the unique session key may be associated with a specific application of the UE 402.

The TX/RX module 440 may be configured to enable communications with the network device 404, e.g., via the wireless transceiver 266.

The TX/RX module 440 may be configured to send the freshness parameter to a NAF of the network device 404 in a configuration that will enable the NAF to generate the unique session key (e.g., via the wireless transceiver 266). The TX/RX module 440 may be configured to communicate with the network device 404 using the unique session key. The TX/RX module 440 may be configured to receive from the NAF a request to start secure communications including a domain name of the NAF and a security protocol identifier.

Referring to the network device 404, the processor(s) 428 may be configured by machine-readable instructions 406. Machine-readable instructions 406 may include one or more instruction modules. The instruction modules may include computer program modules. The instruction modules may include one or more of a freshness parameter module 408, a unique session key module 410, a transmit/receive (TX/RX) module 412, and/or other instruction modules.

The freshness parameter module 408 may be configured to receive from the UE 402 the freshness parameter.

The unique session key module 410 may be configured to receive from a KSF of the network device 404 a first session key. The unique session key module 410 may be configured to generate based on the freshness parameter and the first session key a unique session key.

The TX/RX module 412 may be configured to communicate with the UE 402 using the unique session key (e.g., via the wireless transceiver 266). The TX/RX module 412 may be configured to send to the UE 402 a request to start secure communication including a domain name of the NAF and a security protocol identifier.

In some embodiments, the UE 402 and the network device 404 may be operatively linked via one or more wireless communication links (e.g., wireless communication link 122). It will be appreciated that this is not intended to be limiting, and that the scope of this disclosure includes embodiments in which the UE 402 and the network device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the UE 402 and the network device 404 and/or removable storage that is removably connectable to the UE 402 and the network device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the UE 402 and the network device 404, or other information that enables the UE 402 and the network device 404 to function as described herein.

Processor(s) 428, 432 may be configured to provide information processing capabilities in the UE 402 and the network device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428,432 may include a plurality of processing units and/or processor cores. The processing units may be physically located within the same device, or processor(s) 428,432 may represent processing functionality of a plurality of devices operating in coordination. The processor(s) 428,432 may be configured to execute modules 408-412 and modules 436-440 and/or other modules by software; hardware; firmware; some combination of software, hardware, and/or firmware; and/or other mechanisms for configuring processing capabilities on processor(s) 428,432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-412 and modules 436-440 described below is for illustrative purposes, and is not intended to be limiting, as any of modules 408-412 and modules 436-440 may provide more or less functionality than is described. For example, one or more of the modules 408-412 and modules 436-440 may be eliminated, and some or all of its functionality may be provided by other modules 408-412 and modules 436-440. As another example, the processor(s) 428,432 may be configured to execute one or more additional modules that may perform some or all of the functionality attributed below to one of the modules 408-412 and modules 436-440.

Figure 5A:
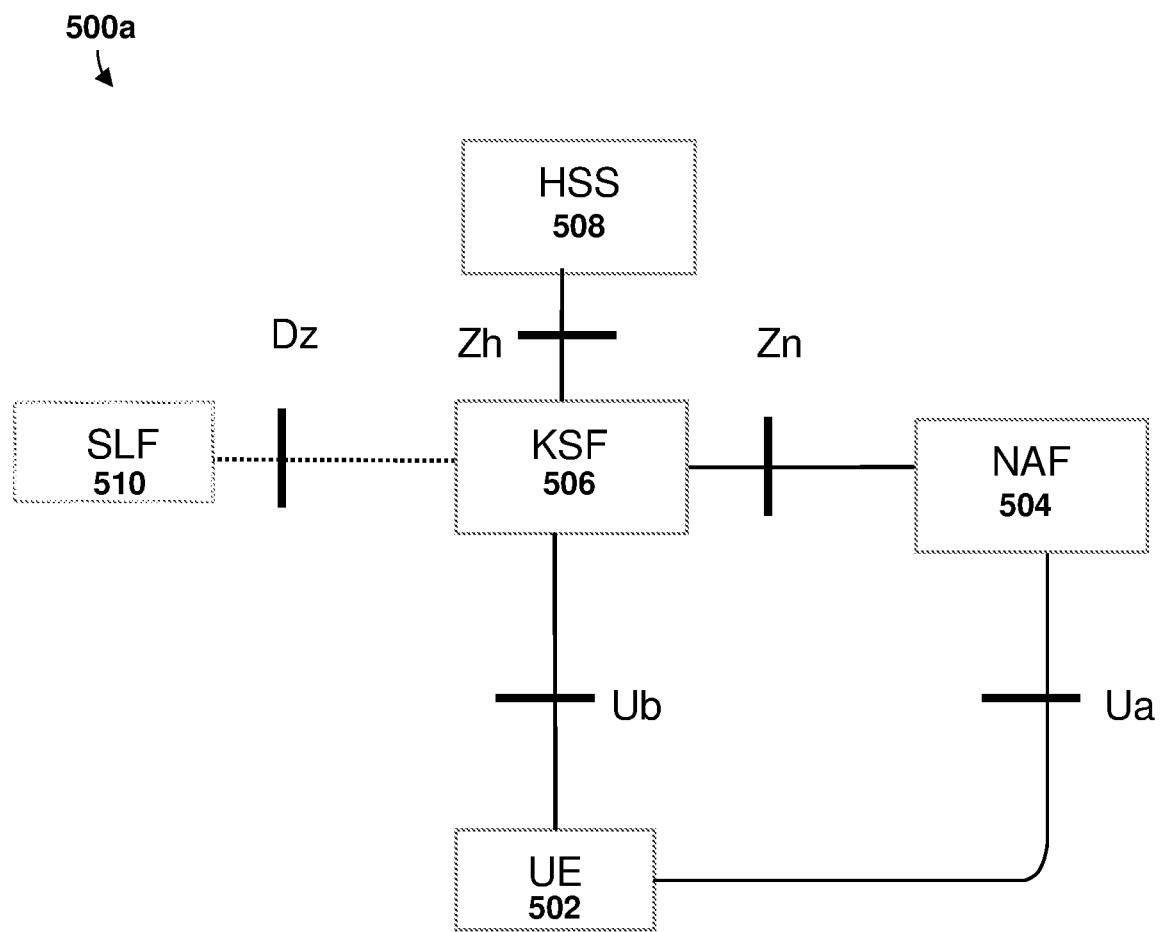
FIG. 5A is a block diagram illustrating an example system for bootstrapping application security suitable for use with various embodiments.

FIG. 5A is a block diagram illustrating an example system 500a for bootstrapping application security suitable for use with various embodiments. With reference to FIGS. 1A-5A, the system 500a may include a UE 502, a NAF 504, a key server function (KSF) 506, a Home Subscriber Server (HSS) 508, and a Subscriber Locator Function (SLF) 510.

In various embodiments, the UE 502 and the KSF 506 may perform authentication operations to authenticate the UE 202. In some embodiments, a negotiation between the KSF 506 and the UE 502 may perform the authentication operations via a Ub interface, and may employ a protocol such as AKA. The UE 502 may communicate with the NAF 504 via a Ua interface. In various embodiments, the UE 502 and the NAF 504 may have no prior security association. The UE 502 may generate a first session key, e.g., Ks_NAF. The NAF 504 may receive a first session key (e.g., Ks_NAF) from the KSF 506 via a Zn interface.

The HSS 508 may serve as a database or other suitable data storage that may store user authentication credentials for the UE 502, such as User Security Settings (USS) (e.g., GBA User Security Settings (GUSS)). In some embodiments, the HSS 508 may map the user authentication credentials to a private identity, such as an IP Multimedia Private Identity (IMPI). The HSS 508 may communicate this and other information to the KSF 506 via a Zh interface. The SLF 510 may store and provide information to identify the HSS 508 that stores information about the UE 502 (i.e., about a specific UE). The KSF 506 and the SLF 510 may communicate over a Dz interface.

Figure 5B:
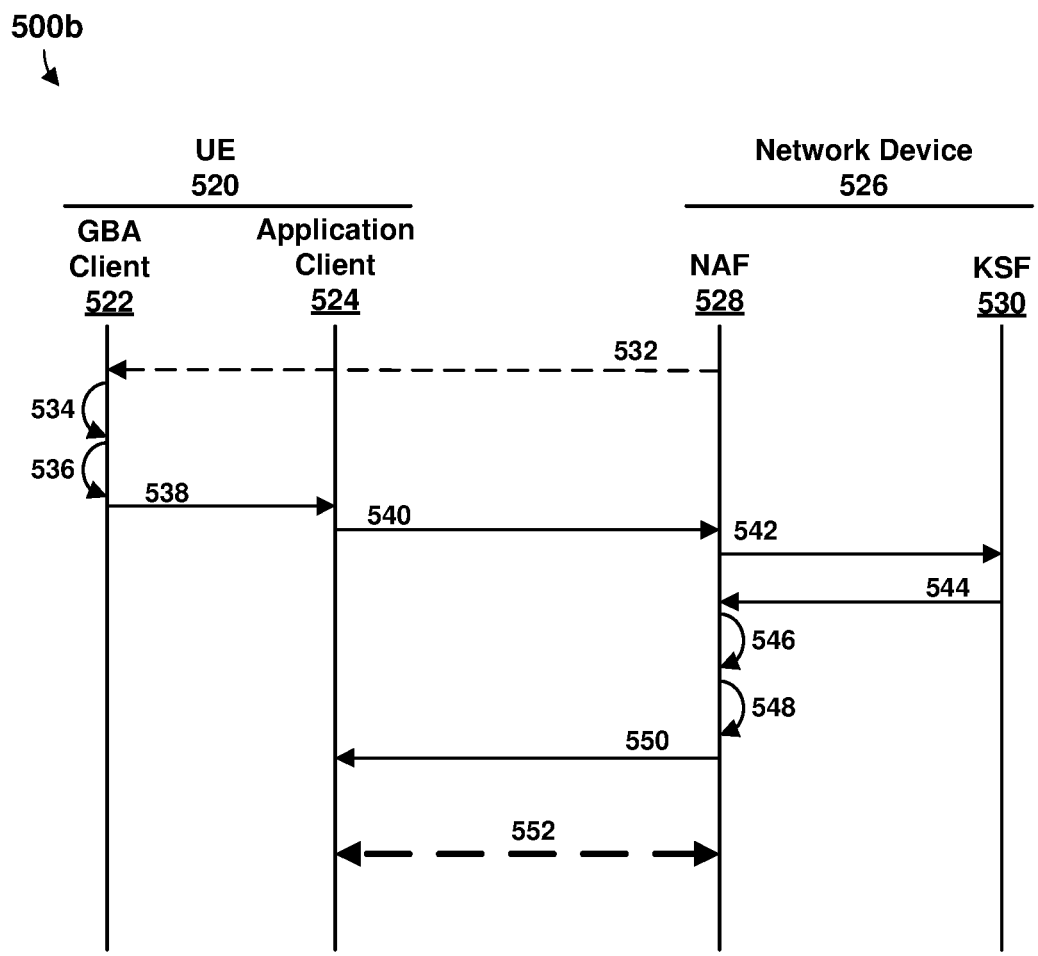
FIG. 5B is a message flow diagram illustrating communications exchanged between a and a network device during a method 500b for securing communications according to various embodiments.

FIG. 5B is a message flow diagram illustrating communications that may be exchanged between a UE and a network device during a method 500b for securing communications according to various embodiments. With reference to FIGS. 1A-5B, in some embodiments, a UE 520 (e.g., 120a-120e, 170, 320, 404, 502) and a network device 526 (e.g., 142a, 154, 156, 158, 350, 402) may communicate over a wireless communication network, aspects of which are described above with reference to FIGS. 1A and 1B. The UE 520 may include a GBA client 522 and an application client 420. The network device 526 may include a NAF 528 and a KSF 530.

The NAF 528 may optionally send a request message 532 to the GBA client 522. The message 532 may include a request to start secure communications including a domain name of the NAF (e.g., an FQDN) and a security protocol identifier (e.g., a Ua security protocol identifier). In some embodiments, the security protocol identifier may enable different keys to be generated for different protocols. In some embodiments, each key may be limited to one use. In some embodiments, the domain name of the NAF may enable a key to be unique to the NAF 528.

In operation 534, the GBA client 522 may generate a freshness parameter. In some embodiments, the freshness parameter may be or include a random number or a pseudorandom number, such as generated using a random number generating algorithm. In some embodiments, the freshness parameter may be or include an incremented value, such as a value of counter that is incremented each time a new unique session key is required (e.g., for a new application or new instantiation of an application). In some embodiments, the incremented value may be used as a nonce value (e.g., an incremented nonce value).

In operation 536, the GBA client 522 may generate a unique session key (which may be referred to as Ks_NAF_unique) based on the first session key (e.g., Ks_NAF) and the freshness parameter. The GBA client 522 may send the freshness parameter to the application client 524 in a message 538.

The application client 524 may send the freshness parameter to the NAF 528 in a message 540. In some embodiments, the message 540 may include a network service request message (for example, an Application Request message). In some embodiments, the network service request message may include a bootstrapping transaction identifier (B-TID). In some embodiments, the B-TID may function as an identifier of the first session key (e.g., Ks_NAF).

The NAF 528 may send the B-TID to the KSF 530 in a message 542. In some embodiments, the message 542 also may include a NAF identifier. In some embodiments, the message 542 may include an Authentication Request message.

The KSF 530 may send a version of the first session key (e.g., Ks_NAF) to the NAF 528 in a message 544. In some embodiments, the message 544 also may include an application specific identifier associated with the UE (e.g., from a user profile associated with the UE). In some embodiments, the message 544 may include an Authentication Answer message.

As noted above, in various embodiments, the UE 520 (e.g., the GBA client 522 and the network device 526 (e.g., the NAF 520) may include the freshness parameter in an existing field of a message between the UE 520 and the network device 526, to enable implementation of the various embodiments without changing a protocol or architecture of messages or message exchanges. For example, for devices employing the Digest AKA protocol, the freshness parameter may be included in a "cnonce" field. As another example, for devices employing Transport Layer Security (TLS), the freshness parameter may be included in an existing field of a ClientHello message or another suitable message. In some embodiments, a length of the freshness parameter may be configured to fit within an such an existing field and/or message. In various embodiments, the GBA client 522 may generate the freshness parameter at a similar security level and/or in a similarly secured memory portion as other cryptographic or session keys. In various embodiments, the GBA client 522 and the NAF 528 may handle, use, process, and/or store the freshness parameter and or the unique session key in a secure memory of the respective device.

In operation 546, the NAF 528 may generate the unique session key based on the first session key received from the KSF 530 and the freshness parameter received from the UE 520. Thus, in operation 546, the NAF is able to determine and use the same unique session key as generated by the UE without the exchange of any private key or information that could be used to defeat the encryption security provided by the unique session key, because the freshness parameter is used only once to generate a unique session key that changes in each communication session.

In operation 548, the NAF 528 may store the generated unique session key in a memory of the NAF 528 (or of the network device 526) for use during the communication session.

The NAF 528 may send a response message 550 to the application client 524 (e.g., responsive to the message 540, e.g., an Application Request message). In some embodiments, the message 550 may include an Application Answer message.

The UE 520 (e.g., the application client 524) and the network device 526 (e.g. the NAF 528) may perform secure communications 552 using the unique session key. As noted above, the unique session key may be unique to one application or service of the UE 520.

Figure 6:
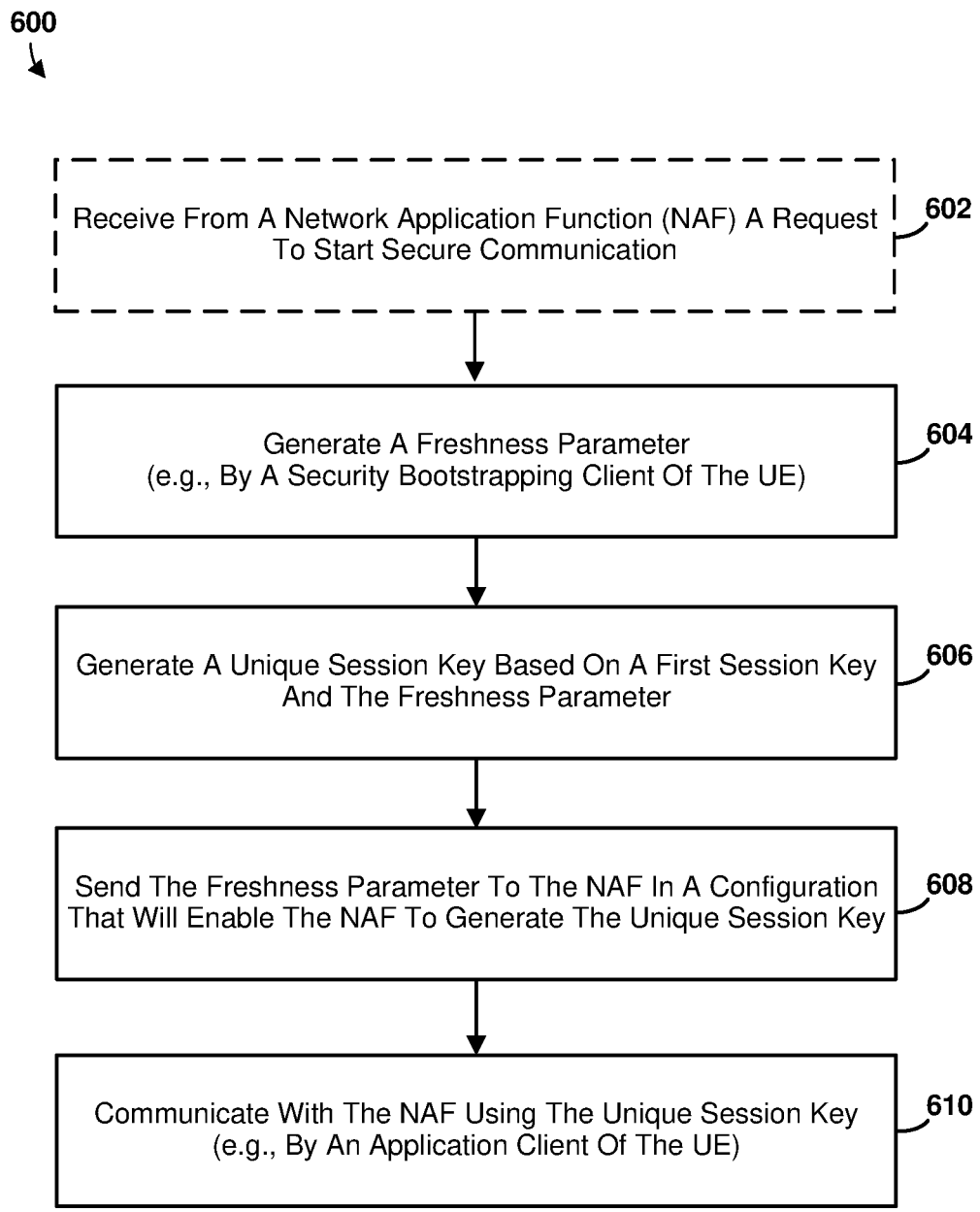
FIG. 6 is a process flow diagram illustrating a method performed by a processor of a UE for securing communications according to various embodiments.

FIG. 6 is a process flow diagram illustrating a method 600 that may be performed by a processor of a UE for securing communications with a network element according to various embodiments. With reference to FIGS. 1A-6, the operations of the method 600 may be performed by a processor (such as the processor 210, 212, 214, 216, 218, 252, 260, 432) of a UE (e.g., 120a-120e, 170, 320, 404, 502, 520).

In optional block 602, the processor may receive a request to start secure communications from a Network Application Function (NAF) of a network device. In some embodiments, the request may include a domain name of the NAF and a security protocol identifier. Means for performing the operations of optional block 602 may include the processor 210, 212, 214, 216, 218, 252, 260, 432, the wireless transceiver 266, the TX/RX module 440, and the GBA client 522.

In block 604, the processor may generate a freshness parameter. In some embodiments, the freshness parameter may be generated by a security bootstrapping client executing in the processor or in another processor (e.g., in a secure processing domain) of the UE. In some embodiments, the freshness parameter may be associated with a specific application or a specific instantiation of an application (for example, a first instantiation, a second instantiation, and so forth) executing in the UE. In some embodiments the freshness parameter may be or include a random value. In some embodiments, the freshness parameter may include be or include an incremented nonce value. Means for performing the operations of block 604 may include the processor 210, 212, 214, 216, 218, 252, 260, 432, the freshness parameter module 436, and/or the GBA client 522.

In block 606, the processor may generate a unique session key based on a first session key and the freshness parameter. For example, the processor may apply the first session key (e.g., Ks_NAF) and the freshness parameter to a key generating algorithm to generate the unique session key (e.g., Ks_NAF_unique). In some embodiments, the unique session key may be associated with a specific application of the UE and the first session key may be associated with the UE. In some embodiments, the specific application may be or may include a specific instantiation of the application (for example, a first instantiation, a second instantiation, and so forth). Means for performing the operations of block 606 may include the processor 210, 212, 214, 216, 218, 252, 260, 432, the unique session key module 438, and the GBA client 522.

In block 608, the processor may send the freshness parameter to a NAF (e.g., 504, 528) in a configuration that will enable the NAF to generate the unique session key. In some embodiments, the processor may send the freshness parameter to the NAF in a network service request message (e.g., an Application Request message). Means for performing the operations of block 608 may include the processor 210, 212, 214, 216, 218, 252, 260, 432, the wireless transceiver 266, the TX/RX module 440, and the application client 524.

In block 610, the processor may communicate with the NAF using the unique session key (e.g., to encrypt messages sent to the NAF and decrypt messages received from the NAF). In some embodiments, an application client executing in the processor may perform the communications with the NAF. Means for performing the operations of block 610 may include the processor 210, 212, 214, 216, 218, 252, 260, 432, the wireless transceiver 266, the TX/RX module 440, and the application client 524.

Figure 7:
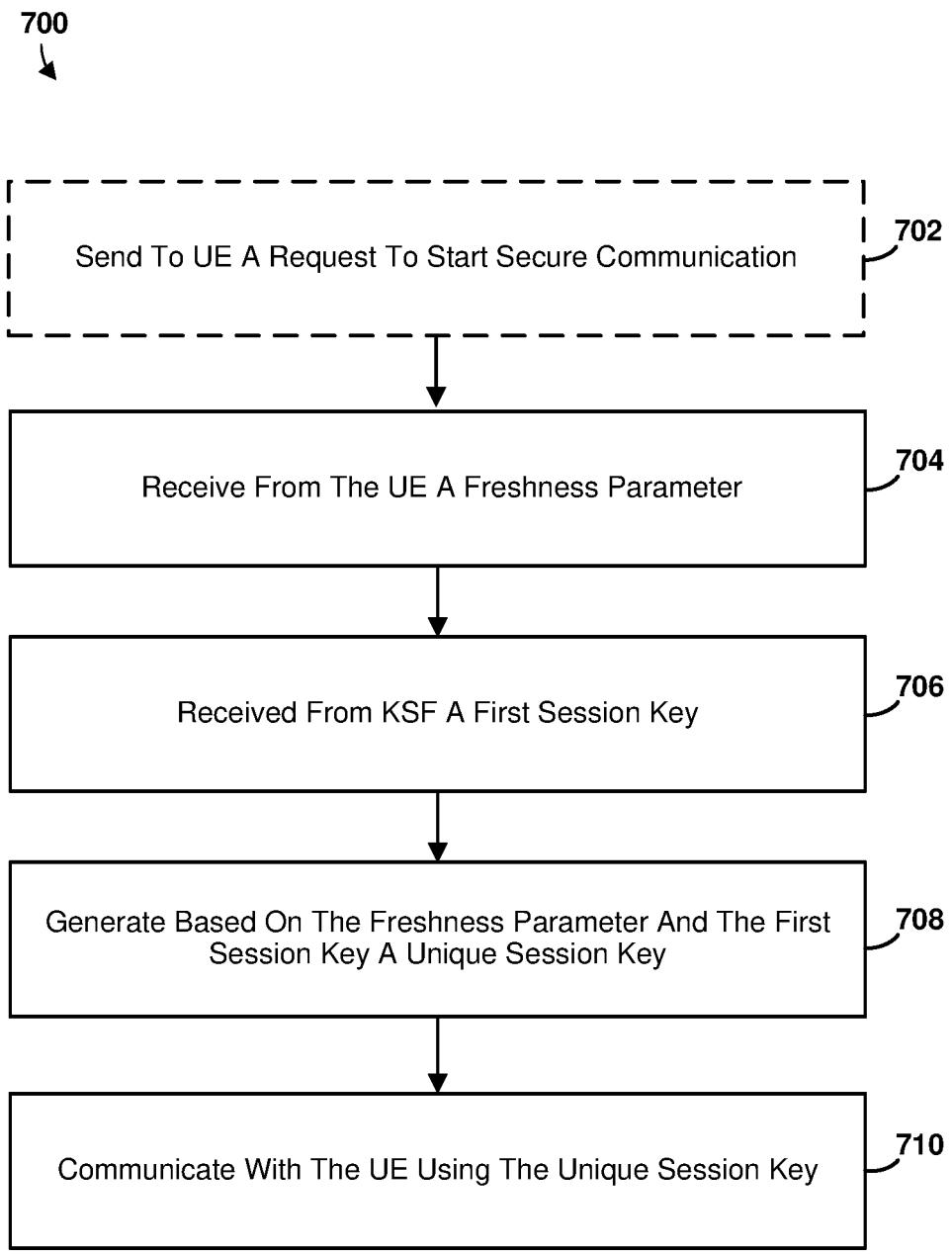
FIG. 7 is a process flow diagram illustrating a method performed by a processor of a network device for securing communications according to various embodiments.

FIG. 7 is a process flow diagram illustrating a method 700 that may be performed by a processor of a network device for securing communications with a UE according to various embodiments. With reference to FIGS. 1A-7, the operations of the method 700 may be performed by a processor (such as the processor 210, 212, 214, 216, 218, 252, 260, 432) of a network device (e.g., 142a, 154, 156, 158, 350, 404, 526).

In optional block 702, the processor may send a request to start secure communications to the UE. In some embodiments, the request may include a domain name of a NAF and a security protocol identifier. Means for performing the operations of optional block 702 may include the processor 210, 212, 214, 216, 218, 252, 260, 432, the wireless transceiver 266, the TX/RX module 440, and the NAF 528.

In block 704, the NAF may receive a freshness parameter from the UE. In some embodiments, the freshness parameter may be associated with a specific application of the UE. In some embodiments, the specific application may be or may include a specific instantiation of the application (for example, a first instantiation, a second instantiation, and so forth). In some embodiments, the freshness parameter may be or include a random value. In some embodiments the freshness parameter may be or include an incremented nonce value. Means for performing the operations of block 704 may include the processor 210, 212, 214, 216, 218, 252, 260, 432, the wireless transceiver 266, the freshness parameter module 408, and the NAF 528.

In block 706, the processor may receive from a Key Server Function (KSF) a first session key. In some embodiments, the first session key may be associated with the UE, for example, a Ks_NAF session key. Means for performing the operations of block 706 may include the processor 210, 212, 214, 216, 218, 252, 260, 432, the unique session key module 410, the NAF 528, and the KSF 506, 530.

In block 708, the processor may generate a unique session key based on the freshness parameter and the first session key. For example, the processor may apply the freshness parameter and the first session key (e.g., Ks_NAF) to the same key generating algorithm as used by the UE in block 606 of the method 600 to generate the unique session key (e.g., Ks_NAF_unique), and thus generate the same unique session key as generated by the UE. In some embodiments, the unique session key may be associated with a specific application of the UE, and the first session key is associated with the UE. In some embodiments, the specific application may be a specific instantiation of the application (e.g., a first instantiation, a second instantiation, and so forth). Means for performing the operations of block 706 may include the processor 210, 212, 214, 216, 218, 252, 260, 432, the unique session key module 410, the NAF 528.

In block 710, the processor may communicate with the UE using the unique session key to encrypt messages sent to the UE and decrypt messages received from the UE. Means for performing the operations of block 710 may include the processor 210, 212, 214, 216, 218, 252, 260, 432, the wireless transceiver 266, the TX/RX module 440, and the NAF 528.

Figure 8:
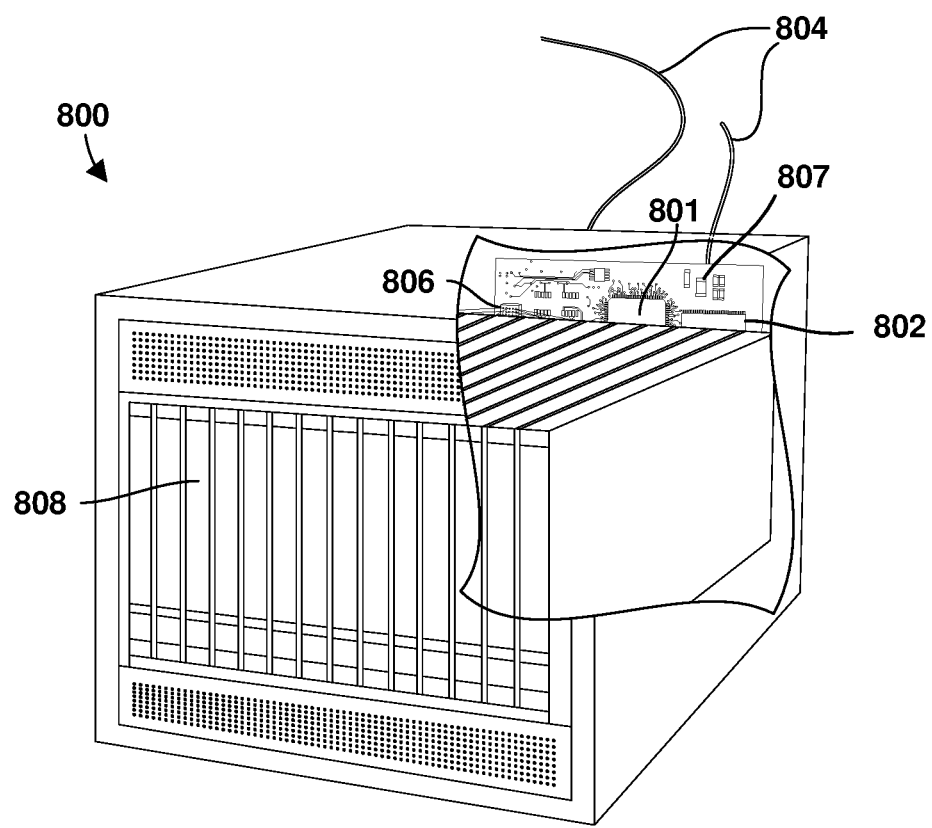
FIG. 8 is a component block diagram of a network device suitable for use with various embodiments.

FIG. 8 is a component block diagram of a network device 800 suitable for use with various embodiments. Such network devices (e.g., the network device 142a, 154, 156, 158, 350, 404, 526) may include at least the components illustrated in FIG. 8. With reference to FIGS. 1A-8, the network device 800 may typically include a processor 801 coupled to volatile memory 802 and a large capacity nonvolatile memory, such as a disk drive 808. The network device 800 also may include a peripheral memory access device 806 such as a floppy disc drive, compact disc (CD) or digital video disc (DVD) drive coupled to the processor 801. The network device 800 also may include network access ports 804 (or interfaces) coupled to the processor 801 for establishing data connections with a network, such as the Internet or a local area network coupled to other system computers and servers. The network device 800 may include one or more antennas 807 for sending and receiving electromagnetic radiation that may be connected to a wireless communication link. The network device 800 may include additional access ports, such as USB, Firewire, Thunderbolt, and the like for coupling to peripherals, external memory, or other devices.

Figure 9:
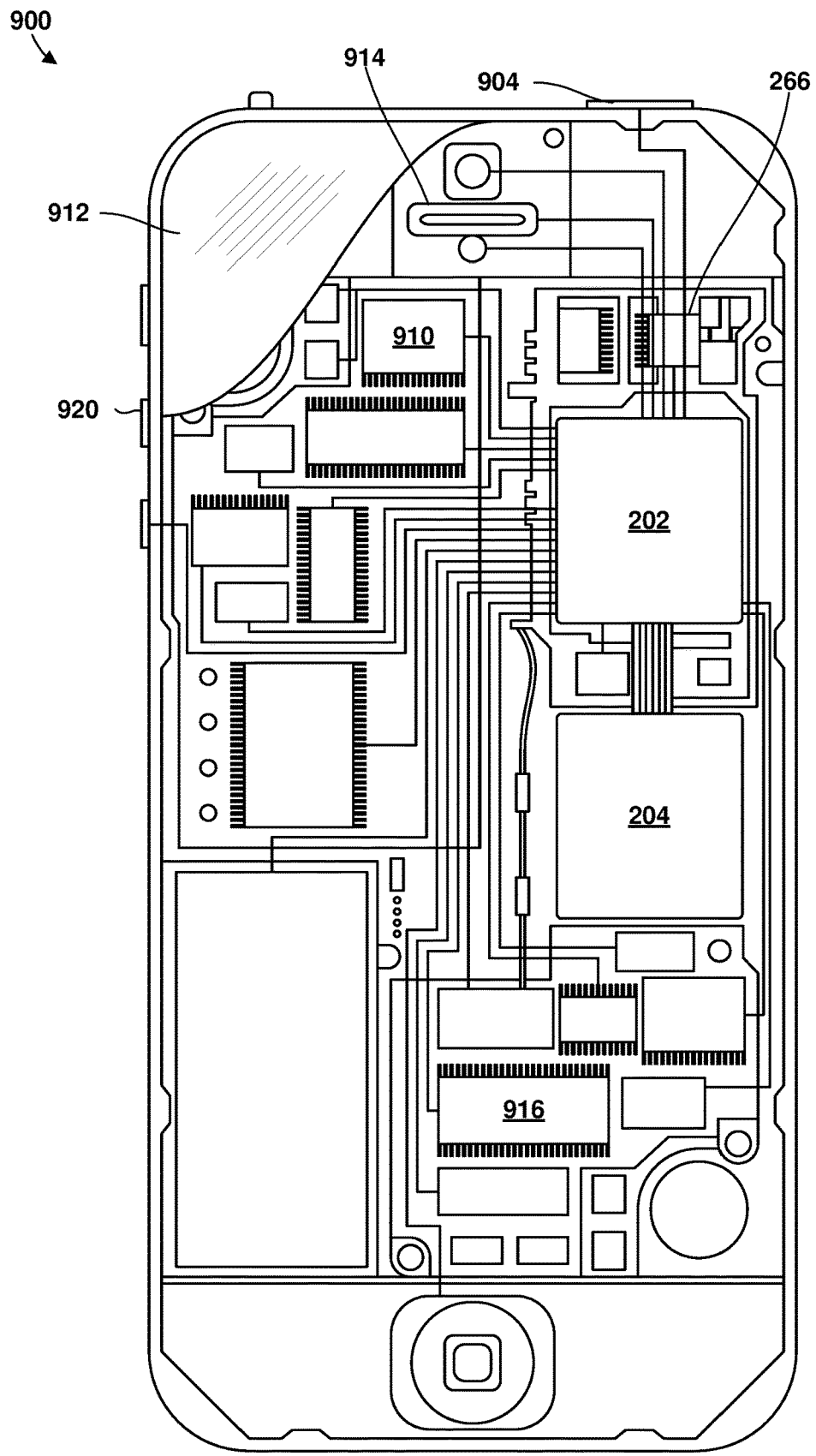
FIG. 9 is a component block diagram of a UE suitable for use with various embodiments.

FIG. 9 is a component block diagram of a UE 900 suitable for use with various embodiments. With reference to FIGS. 1A-9, various embodiments may be implemented on a variety of UEs 900 (for example, the UEs 120a-120e, 170, 320, 402, 502, 520), an example of which is illustrated in FIG. 9 in the form of a smartphone. The UE 900 may include a first SOC 202 (for example, a SOC-CPU) coupled to a second SOC 204 (for example, a 5G capable SOC). The first and second SOCs 202, 204 may be coupled to internal memory 916, a display 912, and to a speaker 914. Additionally, the UE 900 may include an antenna 904 for sending and receiving electromagnetic radiation that may be connected to a wireless transceiver 266 coupled to one or more processors in the first and/or second SOCs 202, 204. The UE 900 may include menu selection buttons or rocker switches 920 for receiving user inputs.

The UE 900 may include a sound encoding/decoding (CODEC) circuit 910, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 910 may include a digital signal processor (DSP) circuit (not shown separately).

The processors of the network device 800 and the UE 900 may be any programmable microprocessor, microcomputer or multiple processor chip or chips that can be configured by software instructions (applications) to perform a variety of functions, including the functions of some implementations described below. In some UEs, multiple processors may be provided, such as one processor within an SOC 204 dedicated to wireless communication functions and one processor within an SOC 202 dedicated to running other applications. Software applications may be stored in the memory 802, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a UE and the UE may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations described herein may be substituted for or combined with one or more operations of the methods and operations.

Implementation examples are described in the following paragraphs. While some of the following implementation examples are described in terms of example methods, further example implementations may include: the example methods discussed in the following paragraphs implemented by a UE or a network device including a processor configured with processor-executable instructions to perform operations of the methods of the following implementation examples; the example methods discussed in the following paragraphs implemented by a UE or a network device including means for performing functions of the methods of the following implementation examples; and the example methods discussed in the following paragraphs may be implemented as a non-transitory processor-readable storage medium having stored thereon processor-executable instructions configured to cause a processor of a UE or a network device to perform the operations of the methods of the following implementation examples.

Example 1. A method of securing communications performed by a processor of a user equipment (UE), including generating a freshness parameter, generating a unique session key based on a first session key and the freshness parameter, sending the freshness parameter to a Network Application Function (NAF) in a configuration that will enable the NAF to generate the unique session key, and communicating with the NAF using the unique session key.

Example 2. The method of example 1, in which the freshness parameter is generated by a security bootstrapping client executing in the processor, and in which an application client executing in the processor communicates with the NAF using the unique session key includes communicating with the NAF using the unique session key.

Example 3. The method of example 2, in which the security bootstrapping client of the UE comprises one of a Generic Bootstrapping Architecture (GBA) client or an Authentication and Key Management for Applications (AKMA) client.

Example 4. The method of any of examples 1-3, in which the freshness parameter is associated with a specific application of the UE.

Example 5. The method of any of examples 1-4, in which the unique session key is associated with a specific application of the UE and the first session key is associated with the UE.

Example 6. The method of example 5, in which the specific application includes a specific instantiation of the application.

Example 7. The method of any of examples 1-6, further including receiving from the NAF a request to start secure communication.

Example 8. The method of any of examples 1-7, in which the freshness parameter includes a random value.

Example 9. The method of any of examples 1-8, in which the freshness parameter includes an incremented nonce value.

Example 10. The method of any of examples 1-9, in which sending the freshness parameter to the NAF in a configuration that will enable the NAF to generate the unique session key includes sending the freshness parameter to the NAF in a network service request message.

Example 11. A method of securing communications performed by a processor of a device, including receiving by a Network Application Function (NAF) from a user equipment (UE) a freshness parameter, receiving from a Key Server Function (KSF) a first session key, generating based on the freshness parameter and the first session key a unique session key, and communicating with the UE using the unique session key.

Example 12. The method of example 11, in which the freshness parameter is generated by a security bootstrapping client of the UE; and an application client of the UED communicates with the NAF using the unique session key.

Example 13. The method of example 12, in which the security bootstrapping client of the UE comprises one of a Generic Bootstrapping Architecture (GBA) client or an Authentication and Key Management for Applications (AKMA) client.

Example 14. The method of any of examples 11-13, in which the freshness parameter is associated with a specific application of the UE.

Example 15. The method of any of examples 11-14, in which the unique session key is associated with a specific application of the UE and the first session key is associated with the UE.

Example 16. The method of any of examples 11-15, wherein the specific application includes a specific instantiation of the application.

Example 17. The method of any of examples 11-16, in which the freshness parameter includes a random value.

Example 18. The method of any of examples 11-17, in which the freshness parameter includes an incremented nonce value.

Example 19. The method of any of examples 11-18, further including sending to the UE a request to start secure communications.

Example 20. The method of any of examples 11-19, in which receiving by the NAF from the UE the freshness parameter includes receiving the freshness parameter in a network service request message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A user equipment (UE), comprising:
a processor configured with processor-executable instructions to:
generate, based on a domain name of a Network Application Function (NAF) and a security protocol identifier for an interface between the NAF and the UE, a first session key;
generate a freshness parameter, the freshness parameter including a counter value associated with a number of generated session keys;
generate a unique session key based on the first session key and the freshness parameter;
send the freshness parameter to the Network Application Function (NAF) in a configuration that will enable the NAF to generate the unique session key; and
communicate with the NAF using the unique session key.

2. The UE of claim 1, wherein:
the freshness parameter is generated by a security bootstrapping client executing in the processor; and
an application client executing in the processor communicates with the NAF using the unique session key.

3. The UE of claim 2, wherein the security bootstrapping client of the UE comprises one of a Generic Bootstrapping Architecture (GBA) client or an Authentication and Key Management for Applications (AKMA) client.

4. The UE of claim 1, wherein the freshness parameter is associated with a specific application of the UE.

5. The UE of claim 1, wherein the processor is further configured with processor-executable instructions such that the unique session key is associated with a specific application of the UE and the first session key is associated with the UE.

6. The UE of claim 5, wherein the processor is further configured with processor-executable instructions such that the specific application comprises a specific instantiation of the application.

7. The UE of claim 1, wherein the processor is further configured with processor-executable instructions such that the freshness parameter comprises a random value.

8. The UE of claim 1, wherein the processor is further configured with processor-executable instructions such that the freshness parameter comprises an incremented nonce value.

9. The UE of claim 1, wherein the processor is further configured with processor-executable instructions to send the freshness parameter to the NAF in a network service request message.

10. A method of securing communications performed by a processor of a user equipment (UE), comprising:
generating, based on a domain name of a Network Application Function (NAF) and a security protocol identifier for an interface between the NAF and the UE, a first session key;
generating a freshness parameter, the freshness parameter including a counter value associated with a number of generated session keys;
generating a unique session key based on the first session key and the freshness parameter;
sending the freshness parameter to the NAF in a configuration that will enable the NAF to generate the unique session key; and
communicating with the NAF using the unique session key.

11. The method of claim 10, wherein:
the freshness parameter is generated by a security bootstrapping client of the UE; and
an application client of the UE communicates with the NAF using the unique session key.

12. The method of claim 11, wherein the security bootstrapping client of the UE comprises one of a Generic Bootstrapping Architecture (GBA) client or an Authentication and Key Management for Applications (AKMA) client.

13. The method of claim 10, wherein the freshness parameter is associated with a specific application of the UE.

14. The method of claim 10, wherein the unique session key is associated with a specific application of the UE and the first session key is associated with the UE.

15. The method of claim 14, wherein the specific application comprises a specific instantiation of the application.

16. The method of claim 11, wherein the freshness parameter comprises a random value.

17. The method of claim 11, wherein the freshness parameter comprises an incremented nonce value.

18. The method of claim 11, wherein sending the freshness parameter to the NAF in a configuration that will enable the NAF to generate the unique session key comprises sending the freshness parameter to the NAF in a network service request message.

19. A network device, comprising:
a processor configured with processor-executable instructions to:
receive, at a Network Application Function (NAF) and from a user equipment (UE), a freshness parameter, the freshness parameter including a counter value associated with a number of generated session keys;
receive, from a key server function, a first session key, wherein the first session key is based on a domain name of the NAF and a security protocol identifier for an interface between the NAF and the UE;
generate based on the freshness parameter and the first session key a unique session key; and
communicate with the UE using the unique session key.

20. The network device of claim 19, wherein the freshness parameter is associated with a specific application of the UE.

21. The network device of claim 19, wherein the freshness parameter comprises a random value.

22. The network device of claim 19, wherein the freshness parameter comprises an incremented nonce value.

23. The network device of claim 19, wherein the unique session key is associated with a specific application of the UE, and the first session key is associated with the UE.

24. The network device of claim 23, wherein the specific application comprises a specific instantiation of the application.

25. The network device of claim 19, wherein the processor is further configured with processor-executable instructions to send to the UE a request to start secure communications.

26. The network device of claim 19, wherein the processor is further configured with processor-executable instructions to receive the freshness parameter in a network service request message.

27. A method of securing communications performed by a processor of a device, comprising:
 receiving by a Network Application Function (NAF) from a user equipment (UE) a freshness parameter, the freshness parameter including a counter value associated with a number of generated session keys;
 receiving from a Key Server Function a first session key, wherein the first session key is based on a domain name of the NAF and a security protocol identifier for an interface between the NAF and the UE;
 generating based on the freshness parameter and the first session key a unique session key; and
 communicating with the UE using the unique session key.

28. The method of claim 27, wherein the freshness parameter is associated with a specific application of the UE.

29. The method of claim 27, wherein the freshness parameter comprises a random value.

30. The method of claim 27, wherein the freshness parameter comprises an incremented nonce value.

31. The method of claim 27, wherein the unique session key is associated with a specific application of the UE, and the first session key is associated with the UE.

32. The method of claim 31, wherein the specific application comprises a specific instantiation of the application.

33. The method of claim 27, further comprising sending to the UE a request to start secure communications.

34. The method of claim 27, wherein receiving, at the NAF and from the UE, the freshness parameter comprises receiving the freshness parameter in a network service request message.

* * * * *